May 19, 1970     I. B. WEISE     3,512,753
VALVE
Filed May 2, 1967     3 Sheets-Sheet 1
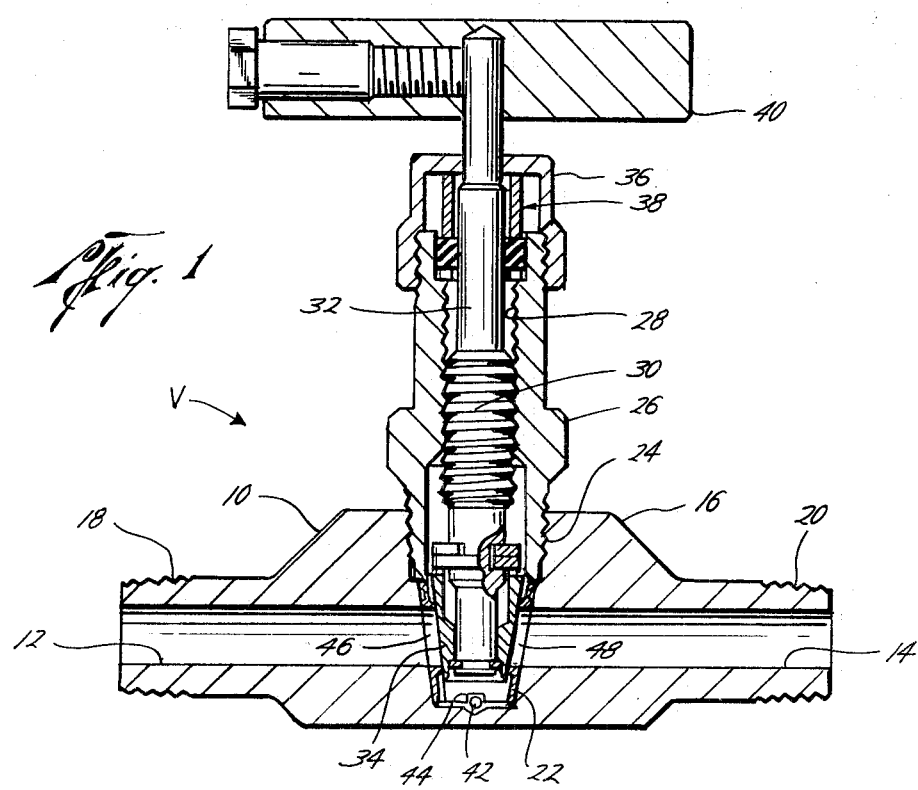
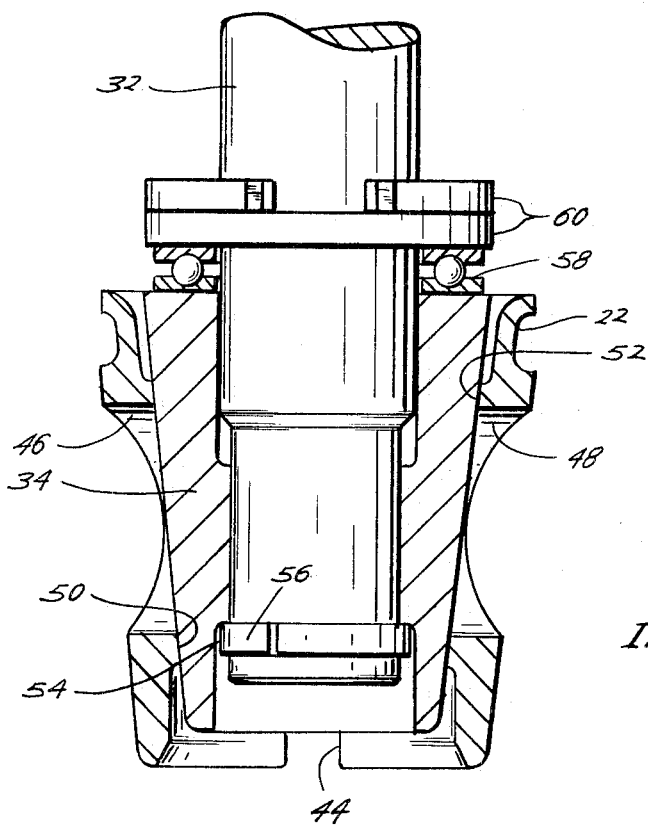
Irvin B. Weise
INVENTOR
BY
ATTORNEYS

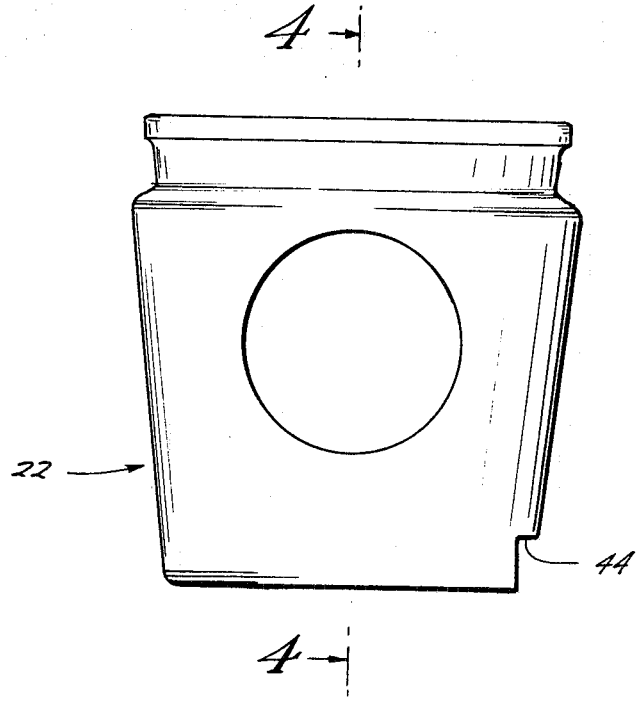
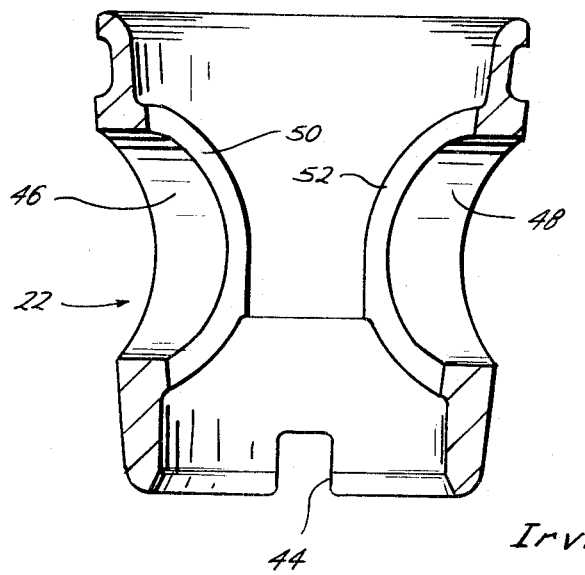

May 19, 1970     I. B. WEISE     3,512,753
VALVE
Filed May 2, 1967     3 Sheets-Sheet 3
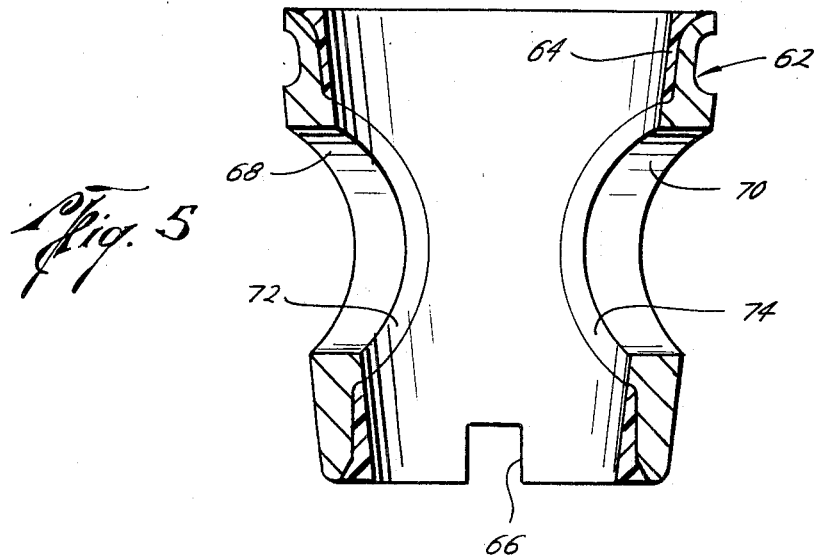
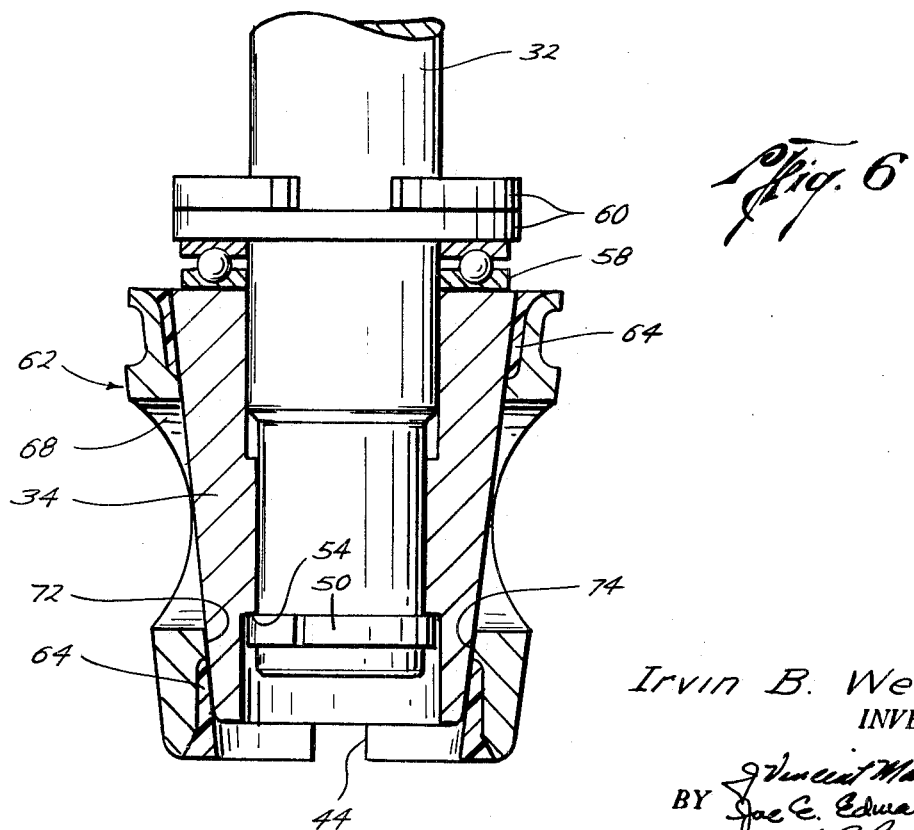
Irvin B. Weise
INVENTOR
BY
ATTORNEYS

United States Patent Office 3,512,753
Patented May 19, 1970

3,512,753
VALVE
Irvin B. Weise, Bellaire, Tex., assignor to Anderson, Greenwood & Co., Bellaire, Tex., a corporation of Texas
Filed May 2, 1967, Ser. No. 635,564
Int. Cl. F16k *31/50, 5/02*
U.S. Cl. 251—317          3 Claims

ABSTRACT OF THE DISCLOSURE

A valve having a hollow metal seat insert defining narrow internal seating surfaces on which a tapered metal plug is adapted to seat to provide a tight shut-off and said hollow metal seat insert adapted to be lined with a soft seating material to provide a soft seat for the valve.

BACKGROUND OF THE INVENTION

The present invention is directed to an improved valve which includes a metal seat insert providing high seating loads for a tight metal-to-metal shut-off and also the insert structure may be replaced with an insert of the same design which includes a soft seat material to provide a soft seating of the valve plug.

Valves which are subjected to high temperatures generally are required to provide a metal-to-metal seating since the available soft seat materials are not suitable for high temperatures. In prior valves having a metal-to-metal seating for closing of the valve, tapered seating has been used in an attempt to obtain sufficiently high seat loadings for tight shut-off. When such valves develop high seat loadings over their extended seating area they require considerable force to achieve a positive shut-off.

Many valves of the prior art having metal-to-metal seating have encountered difficulties in the trapping of trash between the plug and the seat which prevents the valve from closing tightly. Additionally, many valve structures embodying seat inserts have to be removed from the line in which they are installed to remove and replace the seat insert.

It is also particularly advantageous to provide a valve structure which may readily be converted from a metal-to-metal seating to a soft seating by replacement of the seat insert when the soft seat insert provides a secondary metal-to-metal seating in the event the soft seating material is rendered ineffective.

It is therefore an object of the present invention to provide an improved valve having a metal seat insert and a metal plug with high unit seat loading to assure tight shut-off.

Another object is to provide an improved valve having a metal seat insert in which the problems resulting from trapping trash on the seating surface is minimized.

Another object is to provide an improved valve having a metal seat insert which is replaceable without disconnecting the valve from its installed operating position in a line.

Still another object is to provide as an improved subcombination with a valve, a metal seat insert having a structure to coact with the valve plug to assure tight shut-off.

A further object is to provide an improved valve adapted to receive a seat insert which is readily replaceable and easily oriented into its proper position.

Still a further object is to provide an improved valve having a seat insert structure providing soft seating with a metal-to-metal seating in the event the soft seating fails.

BRIEF DESCRIPTION OF THE DRAWINGS

These and other objects and advantages are hereinafter set forth in the description of the preferred form of the present invention illustrated in the drawings wherein:

FIG. 1 is a sectional view of the preferred form of valve of the present invention.

FIG. 2 is a partial detail sectional view showing the seating relationship of the plug and the seat insert.

FIG. 3 is an elevation view of the seat insert.

FIG. 4 is a sectional view of the seat insert taken along line 4—4 in FIG. 3 to illustrate the internal contour of such seat insert.

FIG. 5 is a sectional view of a modified form of seat insert having a soft seat.

FIG. 6 is a view similar to FIG. 2 and includes the modified seat insert shown in FIG. 5.

DESCRIPTION OF THE PREFERRED EMBODIMENTS

The valve V illustrated in FIG. 1 has a body 10 which defines the inlet 12, the outlet 14 and the seating chamber 16 in communication with both said inlet 12 and said outlet 14. Suitable means is provided on the body 10 for connecting the valve V into a line, such as the external threads 18 and 20. The seating chamber 16 is tapered downwardly and inwardly to receive the hollow metal seat insert 22. The outer portion of the seating chamber 16 is threaded as at 24 to provide suitable connection for the bonnet 26. The bonnet is internally threaded as at 28 to provide threaded engagement with the external threads 30 on the valve stem 32. The tapered metal plug 34 is suitably secured to the valve stem 32 and is adapted to be moved axially with the valve stem into and from seating engagement with the seat insert 22. The cap 36 engages the bonnet and actuates the packing gland 38 to provide a seal between the upper exterior of the stem 32 and the interior of the bonnet 26. A suitable means, such as the handle 40, is provided to rotate the stem 32 for actuation of the plug 34. While the valve V is described herein as being in the upright position shown in the drawings with the stem 32 and bonnet 26 above the body 10, it should be understood that the valve V may be installed in any desired position.

The seat insert 22 has an external taper similar to the internal taper of the seating chamber 16 and is adapted to be installed having a press-fit therein and properly oriented by orienting means such as the pin 42 which engages in the groove 44 defined on one side of the lower edge of the seat insert 22. The seat insert defines an inlet port 46 and an outlet port 48. When the seat insert is properly installed and oriented within the seating chamber 16, the inlet port 46 registers with the inlet 12 and the outlet port 48 registers with the outlet 14 whereby communication between inlet 12 and outlet 14 is defined by the ports 46 and 48. The lands 50 and 52 are narrow internal rib-like projections on the interior of seat insert 22 and surround the ports 46 and 48 respectively.

As shown in FIG. 2, the exterior of the plug 34 is tapered downwardly and inwardly and is adapted to seat on the seating surface of the narrow lands 50 and 52. The interior of the plug 34 is hollow and defines the downwardly facing shoulder 54 which is adapted to be engaged by the retaining ring 56 engaged in a groove in the lower exterior of the stem 32. The thrust washer 58 is positioned between the upper surface of the plug 34 and the C-washers 60 which are engaged in slots defined in the exterior of stem 32. Thus, the plug 34 is secured to the stem 32 so that any axial movement of the stem 32 will result in a corresponding axial movement of the plug 34. The plug can be moved axially into and from seating engagement with the lands 50 and 52 on the seat insert 22. The thrust washer 58 is provided to transmit the axial forces of the stem 32 to the plug 34 while allowing the stem 32 to rotate within the plug 34, particularly when the plug 34 is in seating engagement with the seat insert 22 to prevent scoring of the plug 34 on the seat insert lands 50 and 52.

As best seen in FIGS. 3 and 4, the seat insert 22 has an external downward and inward taper so that it may be secured within the seating chamber 16 defined by the body 10. The seat insert 22 is metal such as 316 stainless steel, and is hollow with the lands 50 and 52 projecting inwardly on the interior of the seat insert 22, as hereinbefore described. The inner surfaces of lands 50 and 52 therefore define the seat engaged by the plug 34 and for this reason are tapered to conform to the external taper on the plug 34.

In operation, rotation of the handle 40 rotates the stem 32 to cause the stem 32 and plug 34 to move axially with respect to the bonnet 26 and the seat insert 22. Thus, rotation in one direction moves the plug 34 downward into tight seating engagement with the lands 50 and 52 to close valve V, while rotation in the opposite direction moves the plug 34 out of seating engagement therewith to provide communication through the valve V from the inlet 12 to the outlet 14.

The relatively small seating area provided by the lands 50 and 52, which are the only portions of the seat insert 22 engaging the plug 34 on seating, provides high unit seat loadings without having to exert extreme forces on the plug and the stem, to thereby assure tight shut-off of the valve. A typical example of suitable dimensions for the width of such lands is that lands having a width of 0.050 inch have been found suitable in a valve in which the inlet and outlet bores are ⅜ of an inch. In addition to the very small seating area provided by the seat insert of the present invention, the taper between the exterior surface of the plug 34 and the surfaces of the lands 50 and 52 is such that very large unit seating forces are developed with a minimum force applied to the stem 32 by the handle 40.

Since the seat insert 22 provides a small seating area, it is sometimes desirable to provide the plug 34 with a surface hardness, as by chrome plating for example, to assure that the plug surface is not deformed by the high seating loads applied in closing the valve. Thus, the plug 34 should be sufficiently hard to withstand the seating loading without yielding. If the plug is deformed by seating, on subsequent seatings the deformed portion of the plug probably will not engage the seat in exactly the same position and may result in leakage of the valve when closed.

The seat insert 22 is readily replaceable without having to remove the valve V from a line in which it is installed. The seat insert 22 is removed by first removing the bonnet 26, and the stem 32 and plug 34. A suitable tool is used to wedge the seat insert 22 out of its press-fit engagement in chamber 16. The cooperation of the pin 42 with the groove 44 defined in the lower portion of the seat insert 22 allows a new seat insert to be quickly installed while assuring proper orientation of the inlet and outlet ports of the seat insert with respect to the inlet and outlet of the valve.

The modified seat insert 62 illustrated in FIGS. 5 and 6 is identical with seat insert 22 except that a soft seating material 64, such as nylon or polytetrachloroethylene has been bonded to the interior thereof to provide a soft seat on which the plug 34 seats. The seat insert 62 has an external taper adapted to be pressed into chamber 16 and includes the groove 66 defined on one side of the lower edge of the seat insert 62. The seat insert 62 is hollow and defines the ports 68 and 70 and the internal lands 72 and 74 surrounding such ports as shown. When seat insert 62 is properly installed in chamber 16, port 68 registers with inlet 12 and port 70 registers with outlet 14.

As shown in FIG. 6, the valve stem 32 is connected to the valve plug 34 in the same manner as shown in FIG. 2 with the same parts being given the same numbers. The difference in FIG. 6 is the soft seating material 64 which is bonded to the interior of seat insert 22. The material 64 provides an internal tapered surface adapted to receive the plug 34 thereon. The material is not bonded on the seating surfaces provided by the lands 72 and 74 but does project inwardly therefrom a few thousandths of an inch to assure that the plug 34 has a soft seating when the seat insert 62 is being used.

The seat insert 62 provides a soft seating of plug 34 and the seating surfaces on the lands provide a metal-to-metal back-up seating in the event of failure of the soft seating material 64 such as by fire or heat beyond the capacity of the material. This seat insert 62 thus provides a failsafe seating of a soft seated valve in the event of a failure.

While the preferred form of valve illustrated and described herein includes a seat insert having two opposed ports with internal lands surrounding each port and providing seating surfaces for the plug, it is contemplated that an insert embodying the priniciples of the present invention may have only one port and one internal seating surface defined by a land surrounding such port. An example of such valve would be an angle valve. However, in such modifications, a plug engaging surface should be provided in a position opposed to the seating surface provided by the land so that such plug engaging surface provides support for the plug on seating.

By utilizing the narrow internal seating surfaces provided by the internal lands, the possibility of trapping any trash between the plug and the land seating surfaces is minimized in addition to providing a smaller seating area whereby high unit loadings on such seating surfaces are obtained to assure a positive tight shut-off.

Thus, from the foregoing it can be seen that the present invention provides an improved valve which has very high unit seat loadings to assure tight metal-to-metal shut-off, minimizes trash trapping on one seating surface, and allows ready replacement of the seat insert with assurance of proper orientation of such seat insert in the valve body. Also the valve may employ the modified seat insert to provide soft seating with a back-up metal-to-metal seat available for positive shut-off in the event of failure of the saft seat material.

The foregoing disclosure and description of the invention are illustrative and explanatory thereof.

What is claimed is:

1. A valve comprising:
   a body having an inlet and an outlet and defining a seating chamber in communication with said inlet and said outlet,
   a hollow metal seat insert defining a port,
   said seat insert being adapted to be installed in said seating chamber with said port defining the communication between said inlet and said outlet,
   an internal narrow seating land defined by said seat insert surrounding said port,
   a tapered metal plug movably mounted to said body, and
   means for moving said plug into seating engagement with said seating land to close communication through said body between said inlet and said outlet,
   the inner surface of said seating land being the sole seating surface engaging said plug to close said communication.

2. A valve comprising,
   a body having an inlet and an outlet and defining a seating chamber in communication with said inlet and said outlet,
   a hollow metal seat insert defining an inlet port and an outlet port,
   said seat insert being adapted to be installed in said seating chamber with said ports in register with said inlet and said outlet, said seat insert defining narrow internal lands surrounding said ports, and a metal plug being movably mounted to said body to move into seating engagement with said lands on said seat insert to close communication through said body and away from said lands to establish communication through said body, said internal lands only extending around said ports to provide a minimum seating area.

3. The sub-combination with a valve having a body with an inlet, an outlet, and a seating chamber, a tapered metal plug and means for moving said plug, including a hollow metal seat insert defining a port and an internal land surrounding said port, said seat insert adapted to be installed in said seating chamber with said port establishing communication between said inlet and said outlet, the inner surface of said land having a taper to receive said plug thereon and being the sole seating surface for engaging said plug in seating engagement to provide a tight metal-to-metal shut-off of communication through said valve.

References Cited

UNITED STATES PATENTS

| | | | |
|---|---|---|---|
| 972,336 | 10/1910 | Claflin | 251—327 X |
| 1,086,221 | 2/1914 | Reynolds | 251—317 X |
| 1,754,198 | 4/1930 | Du Bois | 251—327 |
| 2,112,913 | 4/1938 | Lechene | 251—326 |
| 2,122,667 | 7/1938 | Waddell | 251—316 |
| 2,174,861 | 10/1939 | Olson | 251—326 |
| 2,323,894 | 7/1943 | Butler | 251—88 X |
| 2,451,928 | 10/1948 | Doerr et al. | 251—88 |
| 2,510,442 | 6/1950 | Volpin | 251—191 |
| 2,801,820 | 8/1957 | Green | 251—88 |
| 3,010,695 | 11/1961 | Banks | 251—332 X |

HENRY T. KLINKSIEK, Primary Examiner

U.S. Cl. X.R.

251—88, 327